US012370530B2

United States Patent
Liao et al.

(10) Patent No.: US 12,370,530 B2
(45) Date of Patent: Jul. 29, 2025

(54) YOLK/SHELL-TYPE $Co_xCu_{1-x}Co_2O_4@Co_yCu_{1-y}Co_2O_4$ CATALYST AS WELL AS PREPARATION METHOD AND APPLICATION THEREOF TO CATALYTIC HYDROGEN GENERATION

(71) Applicant: HUIZHOU UNIVERSITY, Guangdong (CN)

(72) Inventors: Jinyun Liao, Guangdong (CN); Dongsheng Lu, Guangdong (CN); Hao Li, Guangdong (CN); Quanbing Liu, Guangdong (CN); Junhao Li, Guangdong (CN)

(73) Assignee: HUIZHOU UNIVERSITY, Huizhou (CN)

( * ) Notice: Subject to any disclaimer, the term of this patent is extended or adjusted under 35 U.S.C. 154(b) by 817 days.

(21) Appl. No.: 17/349,897

(22) Filed: Jun. 16, 2021

(65) Prior Publication Data

US 2021/0308656 A1    Oct. 7, 2021

Related U.S. Application Data

(63) Continuation of application No. PCT/CN2019/112244, filed on Oct. 21, 2019.

(30) Foreign Application Priority Data

Dec. 17, 2018 (CN) .............................. 201811541363

(51) Int. Cl.
*B01J 23/75* (2006.01)
*B01J 35/00* (2024.01)
(Continued)

(52) U.S. Cl.
CPC ............ *B01J 23/75* (2013.01); *B01J 35/397* (2024.01); *B01J 35/398* (2024.01); *B01J 35/40* (2024.01);
(Continued)

(58) Field of Classification Search
CPC . B01J 23/75; B01J 37/009; B01J 37/04; B01J 37/06; B01J 37/082; C01B 3/04; C01B 3/047; C01B 2203/1076
See application file for complete search history.

(56) References Cited

U.S. PATENT DOCUMENTS

| 2011/0034328 | A1 | 2/2011 | Kang et al. | |
| 2015/0306573 | A1* | 10/2015 | Calderone | B01J 21/04 |
| | | | | 502/332 |
| 2017/0001168 | A1* | 1/2017 | Park | B01J 20/103 |

FOREIGN PATENT DOCUMENTS

| CN | 101863518 A | 10/2010 |
| CN | 102909028 A | 2/2013 |

(Continued)

OTHER PUBLICATIONS

Machine translation of Liao et al (CN109647404A), pulication date Apr. 19, 2019.*

(Continued)

*Primary Examiner* — Jun Li

(57) ABSTRACT

The present invention relates to the technical field of catalysts, and discloses a yolk/shell-type $Co_xCu_{1-x}Co_2O_4@Co_yCu_{1-y}Co_2O_4$ catalyst as well as a preparation method and application thereof to catalytic hydrogen generation. The preparation method of the yolk/shell-type $Co_xCu_{1-x}Co_2O_4@Co_yCu_{1-y}Co_2O_4$ catalyst includes the steps of: successfully synthesizing, by applying a hydrothermal synthesis method, a $[Co(C_6H_{12}N_4)_2](NO_3)_2$ solid sphere complex from a cobalt salt and hexamethyleneteramine serving as an alkali source; and then, performing calcination to obtain a yolk/shell-type $Co_3O_4$ microsphere structure, adsorbing $Cu^{2+}$ on a surface in a physical adsorption manner, and performing calcination again to form yolk/shell-type $Co_xCu_{1-x}Co_2O_4@Co_yCu_{1-y}Co_2O_4$. The preparation method is simple, raw materials are cheap and available, and (Continued)

the prepared yolk/shell-type $Co_xCu_{1-x}Co_2O_4@Co_yCu_{1-y}Co_2O_4$ catalyst is high in purity, good in catalysis performance and capable of showing excellent catalytic activity in term of ammonia borane catalytic hydrolysis for hydrogen generation.

3 Claims, 4 Drawing Sheets

(51) Int. Cl.
    *B01J 35/02*     (2006.01)
    *B01J 35/08*     (2006.01)
    *B01J 35/30*     (2024.01)
    *B01J 35/40*     (2024.01)
    *B01J 35/51*     (2024.01)
    *B01J 37/00*     (2006.01)
    *B01J 37/04*     (2006.01)
    *B01J 37/06*     (2006.01)
    *B01J 37/08*     (2006.01)
    *C01B 3/04*     (2006.01)
(52) U.S. Cl.
    CPC ............. *B01J 35/51* (2024.01); *B01J 37/009* (2013.01); *B01J 37/04* (2013.01); *B01J 37/06* (2013.01); *B01J 37/082* (2013.01); *C01B 3/047* (2013.01); *C01B 2203/1076* (2013.01)

(56) References Cited

FOREIGN PATENT DOCUMENTS

| CN | 104900420 A | * | 9/2015 | ............. H01G 11/24 |
|---|---|---|---|---|
| CN | 109647404 A | | 4/2019 | |
| CN | 112264014 A | * | 1/2021 | |
| CN | 111545193 B | * | 7/2021 | ......... B01D 53/8628 |
| WO | WO-2009099199 A1 | * | 8/2009 | ............. B82Y 30/00 |
| WO | WO-2016060367 A1 | * | 4/2016 | ............. B01J 20/06 |
| WO | WO-2018006958 A1 | * | 1/2018 | ........... A61K 9/5094 |

OTHER PUBLICATIONS

Zhang et al., Hollow and Core-Shell Nanostructure Co3O4 Derived from a Metal Formate Framework toward High Catalytic Activity of CO Oxidation; ACS Appl. Nano Mater. 2018, 1, 800-806.*
International Search Report of PCT/CN2019/112244.
Written Opinion of PCT/CN2019/112244.

* cited by examiner

YOLK/SHELL-TYPE $Co_xCu_{1-x}Co_2O_4@Co_yCu_{1-y}Co_2O_4$ CATALYST AS WELL AS PREPARATION METHOD AND APPLICATION THEREOF TO CATALYTIC HYDROGEN GENERATION

CROSS-REFERENCE TO RELATED APPLICATIONS

This application is a bypass continuation application of PCT application no.: PCT/CN2019/112244. This application claims priorities from PCT Application No. PCT/CN2019/112244, filed Oct. 21, 2019, and from the Chinese patent application 201811541363.0 filed Dec. 17, 2018, the contents of which are incorporated herein in the entirety by reference.

TECHNICAL FIELD

The present invention relates to the technical field of catalysts, in particular to a yolk/shell-type $Co_xCu_{1-x}Co_2O_4@Co_yCu_{1-y}Co_2O_4$ catalyst as well as a preparation method and application thereof.

BACKGROUND

Through the exploration in recent years, it is found that the design and control of the structure of catalyst particles on the nano scale is very possible to obviously change their physical and chemical properties to desire a catalyst with higher activity. A core-shell structure (marked as "core@shell") has been greatly concerned by researchers due to specific surface properties and an electronic structure. Such structure is protected by a shell layer, so that the stability of a core is also guaranteed, and correspondingly, the service life of the catalyst is prolonged. Meanwhile, elemental species, physical forms and other aspects of an inner core and the shell layer are controlled, and thus, the catalyst is diversified in form and increasingly attracts more attentions in term of application in the field such as catalysis.

A yolk/shell-type core-shell structure is a unique core-shell structure, and is a core-shell structural material which has a cavity between a core and a shell and of which the core is capable of moving. In recent years, many methods for preparing the yolk/shell-type core-shell structure have been reported, and generally include an etching method, a template method, a Kirkendall effect and the like. As early as in 2003, Kaori Kamata et al. (Synthesis and Characterization of Monodispersed Core-Shell Spherical Colloids with Movable Cores, J. Am. Chem. Soc., 2003, 125, 2384-2385) firstly synthesized a material with a yolk/shell structure by using the etching method, however, due to the adoption of an etching link during preparation, a preparation process became complicated, and highly toxic hydrofluoric acid with relatively strong corrosivity was used, thereby resulting in a certain risk for an experimental operation. Tierui Zhang et al. (Formation of Hollow Silica Colloids through a Spontaneous Dissolution-Regrowth Process, Angew. Chem. 2008, 120, 5890-5895) obtained a yolk/shell structure by virtue of spontaneous growth of a silicon shell and by processing a shell structure by using a $NaBH_4$ solution. CM Cui et al. (Facile One-Pot Synthesis of Multi-Yolk-Shell Bi@C Nanostructures by the Nanoscale Kirkendall Effect, Chem.Commun. 2015, 51 (45), 9276-9279) synthesized a novel Bi@C multilayer yolk/shell nanometer structure by virtue of a Kirkendall effect, however, incontrollable core-shell thickness was caused by hollow nanoparticles formed by dispersion.

SUMMARY

The present invention aims to overcome at least one defect in the prior art and to provide a preparation method of a yolk/shell-type $Co_xCu_{1-x}Co_2O_4@Co_yCu_{1-y}Co_2O_4$ (0<x<1, 0<y<1) catalyst. The preparation method is simple and controllable, raw materials are cheap and available, and a yolk/shell-type metal oxide compound formed by calcination is capable of sufficiently exerting a synergetic effect between metals.

Another purpose of the present invention is to provide a yolk/shell-type $Co_xCu_{1-x}Co_2O_4@Co_yCu_{1-y}Co_2O_4$ catalyst prepared by using the preparation method.

Technical solutions adopted in the present invention are described as follows:

provided is a preparation method of a yolk/shell-type $Co_xCu_{1-x}Co_2O_4@Co_yCu_{1-y}Co_2O_4$ catalyst, including the following steps:

step S1, dissolving 3-4.5 mmol of $Co(NO_3)_2 \cdot 6H_2O$, 1.5-2.25 mmol of $C_6H_{12}N_4$ and 1-1.5 mmol of $Na_3C_6H_5O_7 \cdot 2H_2O$ into 30-50 mL of water, and performing continuous stirring until dissolution to obtain a mixed solution;

step S2, transferring the mixed solution to a reactor to be subjected to a reaction at 80-160° C. for 8-24 h;

step S3, performing suction filtration and water washing to obtain a $[Co(C_6H_{12}N_4)_2](NO_3)_2$ precipitate serving as an intermediate, and drying the precipitate at 40-60° C. in a vacuum oven;

step S4, calcining the obtained sample at 200-400° C. for 1-4 h to obtain yolk/shell-type $Co_3O_4$;

step S5, dissolving 0.05-0.1 g of $Co_3O_4$, 0.375-1.5 mmol of copper salt and 0.1875-0.75 mmol of $C_7H_5NaO_3$ into deionized water, and performing continuous stirring until dissolution;

step S6, performing reflux condensation on the solution, obtained in the step S5, at 80-120° C. for 6-12 h, collecting and washing a precipitate, and drying the precipitate at 40-60° C. in a vacuum oven to obtain a sample; and step S7, calcining the sample at 300-500° C. for 2-5 h to obtain yolk/shell-type $Co_xCu_{1-x}Co_2O_4@Co_yCu_{1-y}Co_2O_4$.

In the present invention, firstly, a $[Co(C_6H_{12}N_4)_2](NO_3)_2$ solid sphere complex is successfully synthesized, by applying a hydrothermal synthesis method, from a cobalt salt and hexamethyleneteramine serving as an alkali source; and then, calcination is performed to obtain yolk/shell-type $Co_3O_4$, $Cu^{2+}$ is adsorbed on a surface in a physical adsorption manner, and calcination is performed again to form yolk/shell-type $Co_xCu_{1-x}Co_2O_4@Co_yCu_{1-y}Co_2O_4$. During calcination, heat is transferred from the outside to the inside, $NH_3$ and HCHO gases formed in a process that hexamethyleneteramine is calcined in an air atmosphere are escaped therefrom to form a cavity, and therefore, such method for preparing a yolk/shell-type core-shell structure is simple. Then, thermal adsorption is performed in a reflux condensation manner, integrating heating and stirring, which is superior to cladding realized in a reactor, which is reported in most of documents, stirring enables contact in a reaction to be more sufficient and enables the reaction to be more thorough, and finally, the sample still keeps the yolk/shell-type core-shell structure. In addition, thermal adsorption belongs to physical adsorption and is capable of guaranteeing the purity of a reacted substance, which is different from chemical cladding in which a precipitant is required to be added, so that interaction between the precipitant and an adsorption particle cannot be excluded while cladding is formed, and then, impurities are formed.

In one embodiment, the step S4 includes: heating the obtained sample from room temperature to 200-400° C. at a heating rate of 2-10° C./min, and continuously calcining the sample for 1-4 h to obtain the yolk/shell-type $Co_3O_4$. Heating plays a role in promoting the occurrence of a chemical reaction, so that $[Co(C_6H_{12}N_4)_2](NO_3)_2$ is decomposed to generate $Co_3O_4$.

In one embodiment, in the step S5, the copper salt is $CuCl_2$.

In one embodiment, the step S6 includes: transferring the solution obtained in the step S5 to a single-neck flask, then, putting the flask containing the solution into an oil bath pan, performing reflux condensation at 80-120° C. for 6-12 h, collecting the precipitate, washing the precipitate for 1-5 times, and then, drying the precipitate at 40-60° C. in the vacuum oven to obtain the sample.

In one embodiment, the step S7 includes: heating the sample from room temperature to 300-500° C. at a heating rate of 1-3° C./min, and continuously calcining the sample for 2-5 h to obtain the yolk/shell-type $Co_xCu_{1-x}Co_2O_4@Co_yCu_{1-y}Co_2O_4$. Continuous heating can promote the occurrence of the chemical reaction, so that the $Cu^{2+}$ adsorbed on the surface becomes CuO to enter a $Co_3O_4$ crystal lattice.

Provided is a $[Co(C_6H_{12}N_4)_2](NO_3)_2$ precipitate prepared in the step S3 of the preparation method.

Provided is a yolk/shell-type $Co_xCu_{1-x}Co_2O_4@Co_yCu_{1-y}Co_2O_4$ catalyst prepared by using the preparation method.

Provided is an application of the yolk/shell-type $Co_xCu_{1-x}Co_2O_4@Co_yCu_{1-y}Co_2O_4$ catalyst to ammonia borane catalytic hydrolysis for hydrogen generation. The yolk/shell-type $Co_xCu_{1-x}Co_2O_4@Co_yCu_{1-y}Co_2O_4$ catalyst provided by the present invention can show excellent catalytic activity in term of ammonia borane catalytic hydrolysis for hydrogen generation.

Compared with the prior art, the present invention has the beneficial effects that the physical adsorption manner is used in the process that the yolk/shell-type $Co_xCu_{1-x}Co_2O_4@Co_yCu_{1-y}Co_2O_4$ catalyst is prepared in the present invention, so that the purity of a reaction product is guaranteed. The process for preparing the yolk/shell-type $Co_xCu_{1-x}Co_2O_4@Co_yCu_{1-y}Co_2O_4$ catalyst in the present invention is simple, cheap and available in raw materials and high in operation safety coefficient, and the core-shell structure is easier to control. The prepared yolk/shell-type $Co_xCu_{1-x}Co_2O_4@Co_yCu_{1-y}Co_2O_4$ catalyst in the present invention is high in catalytic activity, relatively high in application value and capable of showing excellent catalytic performance in term of ammonia borane catalytic hydrolysis for hydrogen generation. The preparation method provided by the present invention also has reference significance to multi-active metal oxide nano/microcatalysts for other metal systems.

DETAILED DESCRIPTION

Figure 1:
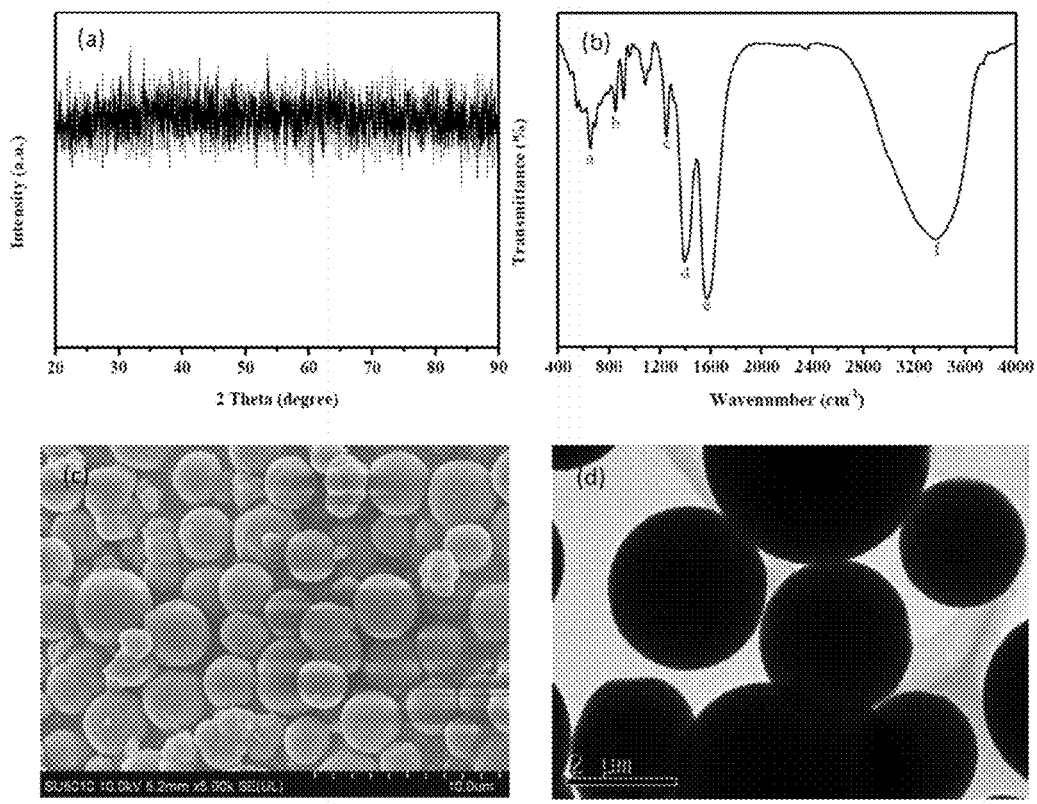
FIG. 1 is a comprehensive test diagram of a $[Co(C_6H_{12}N_4)_2](NO_3)_2$ precipitate in embodiment 1.

In order to make the objectives, technical solutions and advantages of the present invention clearly understood, the present invention will be further described below in detail in conjunction with specific implementation modes. It should be understood that the specific implementation modes described herein are only intended to explain the present invention, rather than to limit the protective scope of the present invention.

Embodiment 1

Provided is a yolk/shell-type $Co_xCu_{1-x}Co_2O_4@Co_yCu_{1-y}Co_2O_4$ catalyst which is prepared by the following process:

step S1, 4.5 mmol of $Co(NO_3)_2·6H_2O$, 2.25 mmol of $C_6H_{12}N_4$ and 1.5 mmol of $Na_3C_6H_5O_7·2H_2O$ are dissolved into 35 mL of water, and are continuously stirred until dissolution to obtain a mixed solution;

step S2, the above-mentioned mixed solution is transferred to a 100 mL reactor to be subjected to a reaction at 100° C. for 24 h and is cooled to room temperature after the reaction is ended;

step S3, suction filtration and water washing are performed to obtain a $[Co(C_6H_{12}N_4)_2](NO_3)_2$ precipitate serving as an intermediate, and the precipitate is dried at 40° C. in a vacuum oven;

step S4, the obtained sample is heated from room temperature to 200° C. at a heating rate of 10° C./min in a muffle furnace and is continuously calcined for 3 h to obtain yolk/shell-type $Co_3O_4$, and the yolk/shell-type $Co_3O_4$ is cooled to room temperature;

step S5, 0.1 g of $Co_3O_4$, 1.5 mmol of $CuCl_2$ and 0.75 mmol of $C_7H_5NaO_3$ are dissolved into 20 mL of deionized water, and are continuously stirred until dissolution;

step S6, the solution obtained in the step S5 is transferred to a 100 mL single-neck flask, and the flask containing the solution is then put into an oil bath pan, reflux condensation is performed at 90° C. for 12 h, and a precipitate is collected, is washed for 3 times, and is dried at 40° C. in a vacuum oven to obtain a sample; and step S7, the sample is heated from room temperature to 400° C. at a heating rate of 2° C./min in a muffle furnace, and is continuously calcined for 3 h to obtain yolk/shell-type $Co_xCu_{1-x}Co_2O_4@Co_yCu_{1-y}Co_2O_4$.

Embodiment 2

Provided is a yolk/shell-type $Co_xCu_{1-x}Co_2O_4@Co_yCu_{1-y}Co_2O_4$ catalyst which is prepared by the following process:

step S1, 3 mmol of $Co(NO_3)_2·6H_2O$, 1.5 mmol of $C_6H_{12}N_4$ and 1 mmol of $Na_3C_6H_5O_7·2H_2O$ are dissolved into 30 mL of water, and are continuously stirred until dissolution to obtain a mixed solution;

step S2, the above-mentioned mixed solution is transferred to a 100 mL reactor to be subjected to a reaction at 100° C. for 24 h and is cooled to room temperature after the reaction is ended;

step S3, suction filtration and water washing are performed to obtain a $[Co(C_6H_{12}N_4)_2](NO_3)_2$ precipitate serving as an intermediate, and the precipitate is dried at 40° C. in a vacuum oven;

step S4, the obtained sample is heated from room temperature to 200° C. at a heating rate of 10° C./min in a muffle furnace and is continuously calcined for 3 h to obtain yolk/shell-type $Co_3O_4$, and the yolk/shell-type $Co_3O_4$ is cooled to room temperature;

step S5, 0.1 g of $Co_3O_4$, 1.5 mmol of $CuCl_2$ and 0.75 mmol of $C_7H_5NaO_3$ are dissolved into 20 mL of deionized water, and are continuously stirred until dissolution;

step S6, the solution obtained in the step S5 is transferred to a 100 mL single-neck flask, and the flask containing the solution is then put into an oil bath pan, reflux condensation is performed at 90° C. for 12 h, and a precipitate is collected, is washed for 3 times, and is dried at 40° C. in a vacuum oven to obtain a sample; and step S7, the sample is heated from room temperature to 400° C. at a heating rate of 2° C./min in a muffle furnace, and is continuously calcined for 3 h to obtain yolk/shell-type $Co_xCu_{1-x}Co_2O_4@Co_yCu_{1-y}Co_2O_4$.

Embodiment 3

Provided is a yolk/shell-type $Co_xCu_{1-x}Co_2O_4@Co_yCu_{1-y}Co_2O_4$ catalyst which is prepared by the following process:

step S1, 4 mmol of $Co(NO_3)_2 \cdot 6H_2O$, 2 mmol of $C_6H_{12}N_4$ and 1.33 mmol of $Na_3C_6H_5O_7 \cdot 2H_2O$ are dissolved into 50 mL of water, and are continuously stirred until dissolution to obtain a mixed solution;

step S2, the above-mentioned mixed solution is transferred to a 100 mL reactor to be subjected to a reaction at 100° C. for 24 h and is cooled to room temperature after the reaction is ended;

step S3, suction filtration and water washing are performed to obtain a $[Co(C_6H_{12}N_4)_2](NO_3)_2$ precipitate serving as an intermediate, and the precipitate is dried at 40° C. in a vacuum oven;

step S4, the obtained sample is heated from room temperature to 200° C. at a heating rate of 10° C./min in a muffle furnace and is continuously calcined for 3 h to obtain yolk/shell-type $Co_3O_4$, and the yolk/shell-type $Co_3O_4$ is cooled to room temperature;

step S5, 0.1 g of $Co_3O_4$, 1.5 mmol of $CuCl_2$ and 0.75 mmol of $C_7H_5NaO_3$ are dissolved into 20 mL of deionized water, and are continuously stirred until dissolution;

step S6, the solution obtained in the step S5 is transferred to a 100 mL single-neck flask, and the flask containing the solution is then put into an oil bath pan, reflux condensation is performed at 90° C. for 12 h, and a precipitate is collected, is washed for 3 times, and is dried at 40° C. in a vacuum oven to obtain a sample; and step S7, the sample is heated from room temperature to 400° C. at a heating rate of 2° C./min in a muffle furnace, and is continuously calcined for 3 h to obtain yolk/shell-type $Co_xCu_{1-x}Co_2O_4@Co_yCu_{1-y}Co_2O_4$.

Embodiment 4

Provided is a yolk/shell-type $Co_xCu_{1-x}Co_2O_4@Co_yCu_{1-y}Co_2O_4$ catalyst which is prepared by the following process:

step S1, 4.5 mmol of $Co(NO_3)_2 \cdot 6H_2O$, 2.25 mmol of $C_6H_{12}N_4$ and 1.5 mmol of $Na_3C_6H_5O_7 \cdot 2H_2O$ are dissolved into 35 mL of water, and are continuously stirred until dissolution to obtain a mixed solution;

step S2, the above-mentioned mixed solution is transferred to a 100 mL reactor to be subjected to a reaction at 160° C. for 8 h and is cooled to room temperature after the reaction is ended;

step S3, suction filtration and water washing are performed to obtain a $[Co(C_6H_{12}N_4)_2](NO_3)_2$ precipitate serving as an intermediate, and the precipitate is dried at 60° C. in a vacuum oven;

step S4, the obtained sample is heated from room temperature to 300° C. at a heating rate of 5° C./min in a muffle furnace and is continuously calcined for 3 h to obtain yolk/shell-type $Co_3O_4$, and the yolk/shell-type $Co_3O_4$ is cooled to room temperature;

step S5, 0.1 g of $Co_3O_4$, 1.5 mmol of $CuCl_2$ and 0.75 mmol of $C_7H_5NaO_3$ are dissolved into 20 mL of deionized water, and are continuously stirred until dissolution;

step S6, the solution obtained in the step S5 is transferred to a 100 mL single-neck flask, and the flask containing the solution is then put into an oil bath pan, reflux condensation is performed at 120° C. for 6 h, and a precipitate is collected, is washed for 3 times, and is dried at 40° C. in a vacuum oven to obtain a sample; and step S7, the sample is heated from room temperature to 500° C. at a heating rate of 1° C./min in a muffle furnace, and is continuously calcined for 2 h to obtain yolk/shell-type $Co_xCu_{1-x}Co_2O_4@Co_yCu_{1-y}Co_2O_4$.

Embodiment 5

Provided is a yolk/shell-type $Co_xCu_{1-x}Co_2O_4@Co_yCu_{1-y}Co_2O_4$ catalyst which is prepared by the following process:

step S1, 4.5 mmol of $Co(NO_3)_2 \cdot 6H_2O$, 2.25 mmol of $C_6H_{12}N_4$ and 1.5 mmol of $Na_3C_6H_5O_7 \cdot 2H_2O$ are dissolved into 35 mL of water, and are continuously stirred until dissolution to obtain a mixed solution;

step S2, the above-mentioned mixed solution is transferred to a 100 mL reactor to be subjected to a reaction at 120° C. for 20 h and is cooled to room temperature after the reaction is ended;

step S3, suction filtration and water washing are performed to obtain a $[Co(C_6H_{12}N_4)_2](NO_3)_2$ precipitate serving as an intermediate, and the precipitate is dried at 40° C. in a vacuum oven;

step S4, the obtained sample is heated from room temperature to 400° C. at a heating rate of 2° C./min in a muffle furnace and is continuously calcined for 1 h to obtain yolk/shell-type $Co_3O_4$, and the yolk/shell-type $Co_3O_4$ is cooled to room temperature;

step S5, 0.1 g of $Co_3O_4$, 1.5 mmol of $CuCl_2$ and 0.75 mmol of $C_7H_5NaO_3$ are dissolved into 20 mL of deionized water, and are continuously stirred until dissolution;

step S6, the solution obtained in the step S5 is transferred to a 100 mL single-neck flask, and the flask containing the solution is then put into an oil bath pan, reflux condensation is performed at 80° C. for 12 h, and a precipitate is collected, is washed for 3 times, and is dried at 60° C. in a vacuum oven to obtain a sample; and step S7, the sample is heated from room temperature to 300° C. at a heating rate of 3° C./min in a muffle furnace, and is continuously calcined for 5 h to obtain yolk/shell-type $Co_xCu_{1-x}Co_2O_4@Co_yCu_{1-y}Co_2O_4$.

Embodiment 6

Provided is a yolk/shell-type $Co_xCu_{1-x}Co_2O_4@Co_yCu_{1-y}Co_2O_4$ catalyst which is prepared by the following process:

step S1, 4.5 mmol of $Co(NO_3)_2 \cdot 6H_2O$, 2.25 mmol of $C_6H_{12}N_4$ and 1.5 mmol of $Na_3C_6H_5O_7 \cdot 2H_2O$ are dissolved into 35 mL of water, and are continuously stirred until dissolution to obtain a mixed solution;

step S2, the above-mentioned mixed solution is transferred to a 100 mL reactor to be subjected to a reaction at 100° C. for 24 h and is cooled to room temperature after the reaction is ended;

step S3, suction filtration and water washing are performed to obtain a $[Co(C_6H_{12}N_4)_2](NO_3)_2$ precipitate serving as an intermediate, and the precipitate is dried at 40° C. in a vacuum oven;

step S4, the obtained sample is heated from the room temperature to 200° C. at a heating rate of 10° C./min in a muffle furnace and is continuously calcined to obtain yolk/shell-type $Co_3O_4$, and the yolk/shell-type $Co_3O_4$ is cooled to room temperature;

step S5, 0.1 g of $Co_3O_4$, 0.5 mmol of $CuCl_2$ and 0.25 mmol of $C_7H_5NaO_3$ are dissolved into 20 mL of deionized water, and are continuously stirred until dissolution;

step S6, the solution obtained in the step S5 is transferred to a 100 mL single-neck flask, and the flask containing the solution is then put into an oil bath pan, reflux condensation is performed at 90° C. for 12 h, and a precipitate is collected, is washed for 3 times, and is dried at 40° C. in a vacuum oven to obtain a sample; and step S7, the sample is heated from room temperature to 400° C. at a heating rate of 2° C./min in a muffle furnace, and is continuously calcined for 3 h to obtain yolk/shell-type $Co_xCu_{1-x}Co_2O_4@Co_yCu_{1-y}Co_2O_4$.

Embodiment 7

Provided is a yolk/shell-type $Co_xCu_{1-x}Co_2O_4@Co_yCu_{1-y}Co_2O_4$ catalyst which is prepared by the following process:

step S1, 4.5 mmol of $Co(NO_3)_2 \cdot 6H_2O$, 2.25 mmol of $C_6H_{12}N_4$ and 1.5 mmol of $Na_3C_6H_5O_7 \cdot 2H_2O$ are dissolved into 35 mL of water, and are continuously stirred until dissolution to obtain a mixed solution;

step S2, the above-mentioned mixed solution is transferred to a 100 mL reactor to be subjected to a reaction at 100° C. for 24 h and is cooled to room temperature after the reaction is ended;

step S3, suction filtration and water washing are performed to obtain a $[Co(C_6H_{12}N_4)_2](NO_3)_2$ precipitate serving as an intermediate, and the precipitate is dried at 40° C. in a vacuum oven;

step S4, the obtained sample is heated from room temperature to 200° C. at a heating rate of 10° C./min in a muffle furnace and is continuously calcined for 3 h to obtain yolk/shell-type $Co_3O_4$, and the yolk/shell-type $Co_3O_4$ is cooled to room temperature;

step S5, 0.05 g of $Co_3O_4$, 0.375 mmol of $CuCl_2$ and 0.1875 mmol of $C_7H_5NaO_3$ are dissolved into 20 mL of deionized water, and are continuously stirred until dissolution;

step S6, the solution obtained in the step S5 is transferred to a 100 mL single-neck flask, and the flask containing the solution is then put into an oil bath pan, reflux condensation is performed at 90° C. for 12 h, and a precipitate is collected, is washed for 3 times, and is dried at 40° C. in a vacuum oven to obtain a sample; and step S7, the sample is heated from room temperature to 400° C. at a heating rate of 2° C./min in a muffle furnace, and is continuously calcined for 3 h to obtain yolk/shell-type $Co_xCu_{1-x}Co_2O_4@Co_yCu_{1-y}Co_2O_4$.

Embodiment 8

Provided is a yolk/shell-type $Co_xCu_{1-x}Co_2O_4@Co_yCu_{1-y}Co_2O_4$ catalyst which is prepared by the following process:

step S1, 4.5 mmol of $Co(NO_3)_2 \cdot 6H_2O$, 2.25 mmol of $C_6H_{12}N_4$ and 1.5 mmol of $Na_3C_6H_5O_7 \cdot 2H_2O$ are dissolved into 35 mL of water, and are continuously stirred until dissolution to obtain a mixed solution;

step S2, the above-mentioned mixed solution is transferred to a 100 mL reactor to be subjected to a reaction at 100° C. for 24 h and is cooled to room temperature after the reaction is ended;

step S3, suction filtration and water washing are performed to obtain a $[Co(C_6H_{12}N_4)_2](NO_3)_2$ precipitate serving as an intermediate, and the precipitate is dried at 40° C. in a vacuum oven;

step S4, the obtained sample is heated from the room temperature to 200° C. at a heating rate of 10° C./min in a muffle furnace and is continuously calcined for 3 h to obtain yolk/shell-type $Co_3O_4$, and the yolk/shell-type $Co_3O_4$ is cooled to room temperature;

step S5, 0.1 g of $Co_3O_4$, 0.75 mmol of $CuCl_2$ and 0.375 mmol of $C_7H_5NaO_3$ are dissolved into 20 mL of deionized water, and are continuously stirred until dissolution;

step S6, the solution obtained in the step S5 is transferred to a 100 mL single-neck flask, and the flask containing the solution is then put into an oil bath pan, reflux condensation is performed at 90° C. for 12 h, and a precipitate is collected, is washed for 3 times, and is dried at 40° C. in a vacuum oven to obtain a sample; and step S7, the sample is heated from room temperature to 400° C. at a heating rate of 2° C./min in a muffle furnace, and is continuously calcined for 3 h to obtain yolk/shell-type $Co_xCu_{1-x}Co_2O_4@Co_yCu_{1-y}Co_2O_4$.

The $[Co(C_6H_{12}N_4)_2](NO_3)_2$ precipitates and the yolk/shell-type $Co_xCu_{1-x}Co_2O_4@Co_yCu_{1-y}Co_2O_4$ catalysts prepared in embodiments 1-8 are subjected to analysis and test including SEM test analysis, TEM test analysis, XRD test analysis and FTIR test analysis.

In FIG. 1, a, b, c and d are respectively XRD, FTIR, SEM and TEM test diagrams of the $[Co(C_6H_{12}N_4)_2](NO_3)_2$ precipitate in embodiment 1. It can be seen from a scanning diagram of the SEM test that the appearance of the prepared $[Co(C_6H_{12}N_4)_2](NO_3)_2$ precipitate is of a spherical structure. It can be seen from a projection electron micrograph of the TEM test that the prepared $[Co(C_6H_{12}N_4)_2](NO_3)_2$ precipitate is a solid sphere of which the diameter is about 2 μm.

It can be seen from the XRD test that the prepared [Co($C_6H_{12}N_4$)$_2$](NO$_3$)$_2$ precipitate has no peak in an XRD spectrogram, which shows that the obtained [Co(C$_6$H$_{12}$N$_4$)$_2$](NO$_3$)$_2$ is an amorphous solid. It can be seen from the FTIR test that a characteristic peak of NO$_3$ appears at 1387 cm$^{-1}$ in an infrared spectrogram, and C—N stretching vibration peaks appear at 1235 cm$^{-1}$ and 1543 cm$^{-1}$, which shows that the [Co(C$_6$H$_{12}$N$_4$)$_2$](NO$_3$)$_2$ precipitate serving as a target product is obtained. The specific infrared analysis of the [Co(C$_6$H$_{12}$N$_4$)$_2$](NO$_3$)$_2$ precipitate refers to table 1.

TABLE 1

| Label | Position (cm$^{-1}$) | Assignment | species |
|---|---|---|---|
| a | 672 | CNC | C$_6$H$_{12}$N$_4$ |
| b | 823 | C—H | C$_6$H$_{12}$N$_4$ |
| c | 1235 | C—N | C$_6$H$_{12}$N$_4$ |
| d | 1387 | C—H, NO$_3^-$ | C$_6$H$_{12}$N$_4$, Co(NO$_3$)$_2$ |
| e | 1543 | C—N | C$_6$H$_{12}$N$_4$ |
| f | 3395 | O—H | H$_2$O |

Figure 2:
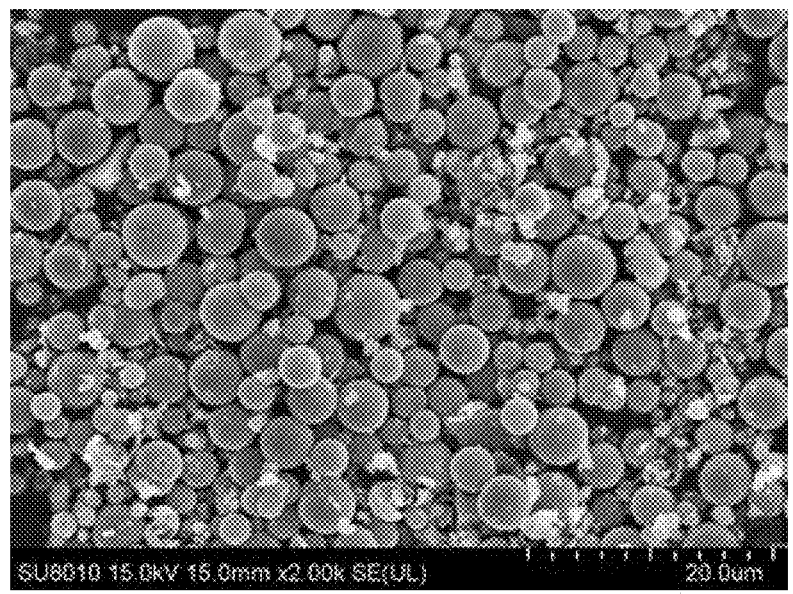
FIG. 2 is an SEM diagram of a yolk/shell-type $Co_xCu_{1-x}Co_2O_4@Co_yCu_{1-y}Co_2O_4$ catalyst in embodiment 1.

For the yolk/shell-type Co$_x$Cu$_{1-x}$Co$_2$O$_4$@Co$_y$Cu$_{1-y}$Co$_2$O$_4$, it can be seen from the scanning diagram of the SEM test that the synthesized yolk/shell-type Co$_x$Cu$_{1-x}$Co$_2$O$_4$@Co$_y$Cu$_{1-y}$Co$_2$O$_4$ is shaped like a microsphere of which the diameter is about 5 μm, and it can be seen from a damaged structure that the prepared sphere is a hollow sphere, as shown in FIG. 2 which is an SEM diagram of the yolk/shell-type Co$_x$Cu$_{1-x}$Co$_2$O$_4$@Co$_y$Cu$_{1-y}$Co$_2$O$_4$ catalyst in embodiment 1.

Figure 3:
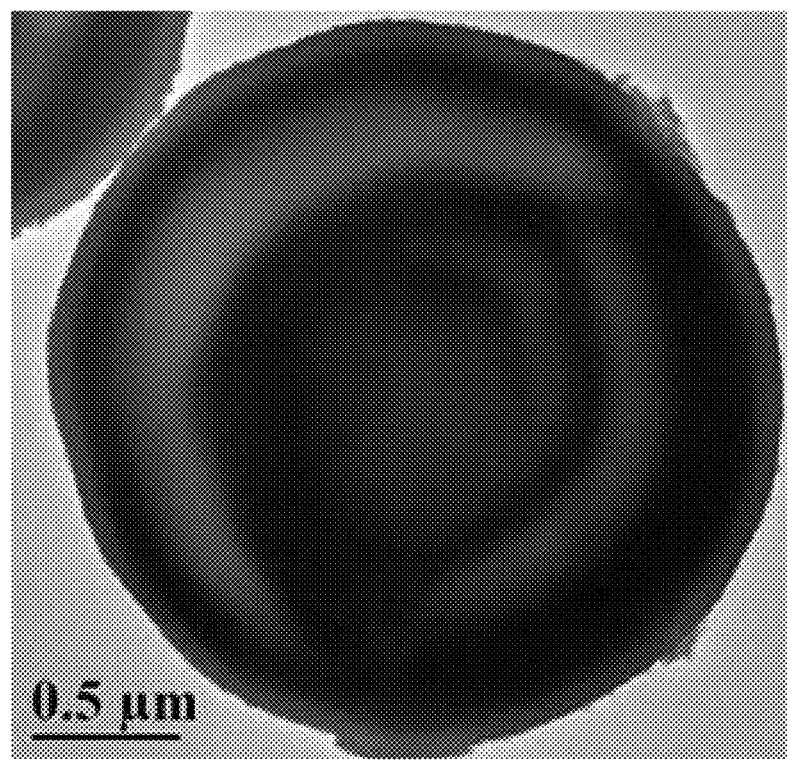
FIG. 3 is a TEM diagram of the yolk/shell-type $Co_xCu_{1-x}Co_2O_4@Co_yCu_{1-y}Co_2O_4$ catalyst in embodiment 1.

It can also be seen from a scanning diagram of the TEM test that the synthesized yolk/shell-type Co$_x$Cu$_{1-x}$Co$_2$O$_4$@Co$_y$Cu$_{1-y}$Co$_2$O$_4$ is shaped like a microsphere of which the diameter is about 5 μm, as shown in FIG. 3 which is a TEM diagram of the yolk/shell-type Co$_x$Cu$_{1-x}$Co$_2$O$_4$@Co$_y$Cu$_{1-y}$Co$_2$O$_4$ catalyst in embodiment 1.

Figure 4:
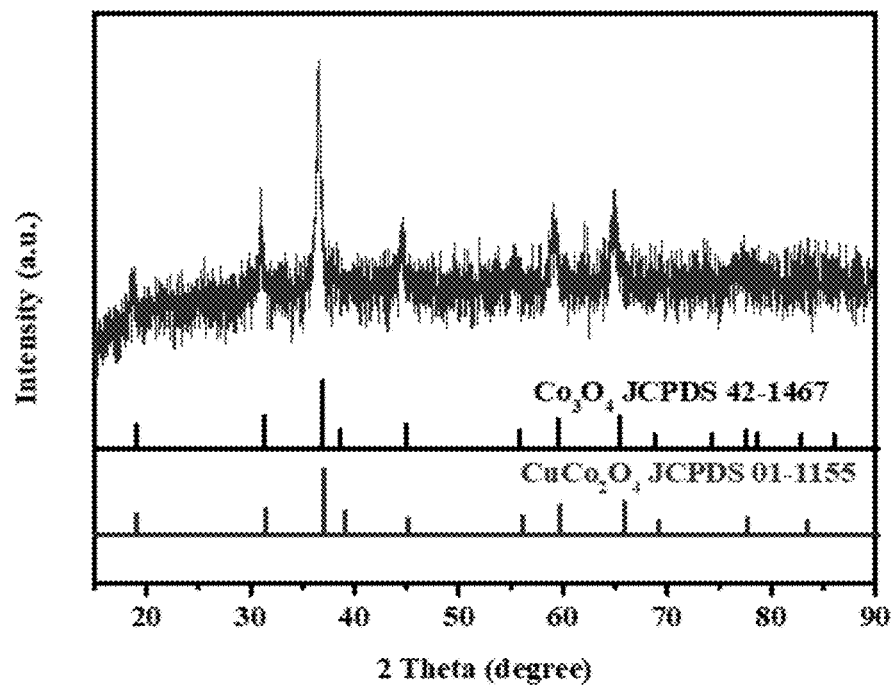
FIG. 4 is an XRD diagram of the yolk/shell-type $Co_xCu_{1-x}Co_2O_4@Co_yCu_{1-y}Co_2O_4$ catalyst in embodiment 1.

It can be seen from XRD test that the characteristic peaks of the synthesized yolk/shell-type Co$_x$Cu$_{1-x}$Co$_2$O$_4$@Co$_y$Cu$_{1-y}$Co$_2$O$_4$ are in one-to-one correspondence to standard cards of Co$_3$O$_4$ and CuCo$_2$O$_4$, which shows that the yolk/shell-type Co$_x$Cu$_{1-x}$Co$_2$O$_4$@Co$_y$Cu$_{1-y}$Co$_2$O$_4$ catalyst serving as a target product is obtained, as shown in FIG. 4 which is an XRD diagram of the yolk/shell-type Co$_x$Cu$_{1-x}$Co$_2$O$_4$@Co$_y$Cu$_{1-y}$Co$_2$O$_4$ catalyst in embodiment 1.

Figure 5:
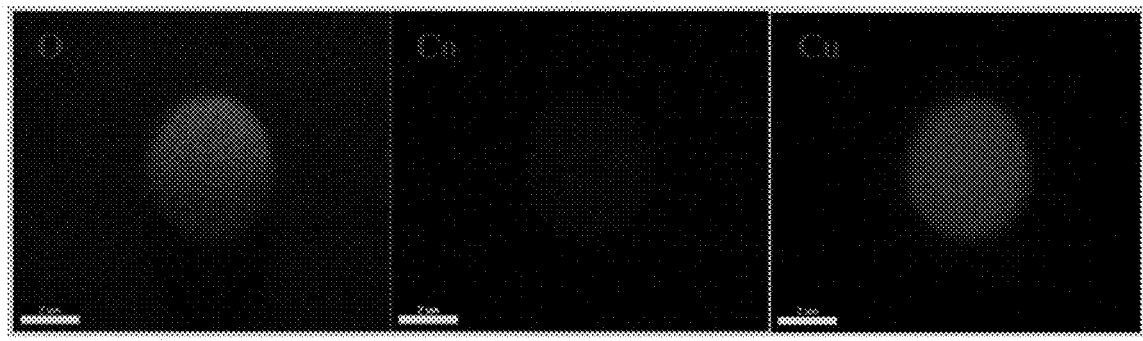
FIG. 5 is an EDS-Mapping test diagram of the yolk/shell-type $Co_xCu_{1-x}Co_2O_4@Co_yCu_{1-y}Co_2O_4$ catalyst in embodiment 1.
Figure 6:
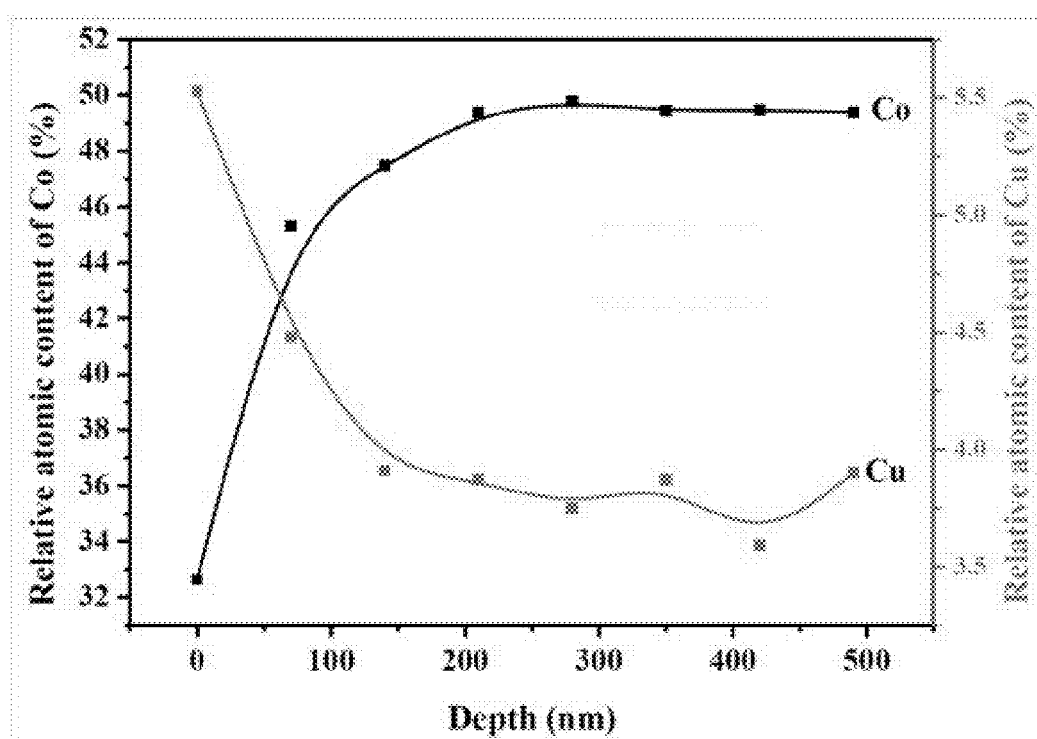
FIG. 6 is a diagram showing a relationship that the contents of elements in the yolk/shell-type $Co_xCu_{1-x}Co_2O_4@Co_yCu_{1-y}Co_2O_4$ catalyst in embodiment 1 change depending on the depth of a sample.

Single sphere of the yolk/shell-type Co$_x$Cu$_{1-x}$Co$_2$O$_4$@Co$_y$Cu$_{1-y}$Co$_2$O$_4$ catalysts prepared in embodiments 1-8 is subjected to an EDS test from which it can be known that three elements including Cu, Co and O are uniformly distributed in the sphere, which shows that the sphere is a complex of CuCo$_2$O$_4$ and Co$_3$O$_4$, and therefore, the complex can be simply expressed as Co$_x$Cu$_{1-x}$Co$_2$O$_4$ in the present invention, as shown in FIG. 5 which is an EDS-Mapping test diagram of single sphere of the yolk/shell-type Co$_x$Cu$_{1-x}$Co$_2$O$_4$@Co$_y$Cu$_{1-y}$Co$_2$O$_4$ catalyst in embodiment 1. The yolk/shell-type Co$_x$Cu$_{1-x}$Co$_2$O$_4$@Co$_y$Cu$_{1-y}$Co$_2$O$_4$ catalysts prepared in embodiments 1-8 are subjected to an XPS test from which it can be known that the content of Co is increased and the content of Cu is reduced with the increment of the depth of the sample, which shows that the compositions of a yolk and a shell are different, and therefore, the obtained product can be expressed by Co$_x$Cu$_{1-x}$Co$_2$O$_4$@Co$_y$Cu$_{1-y}$Co$_2$O$_4$, as shown in FIG. 6 which is a diagram showing a relationship that the contents of elements in the yolk/shell-type Co$_x$Cu$_{1-x}$Co$_2$O$_4$@Co$_y$Cu$_{1-y}$Co$_2$O$_4$ catalyst in embodiment 1 change depending on the depth of the sample.

Figure 7:
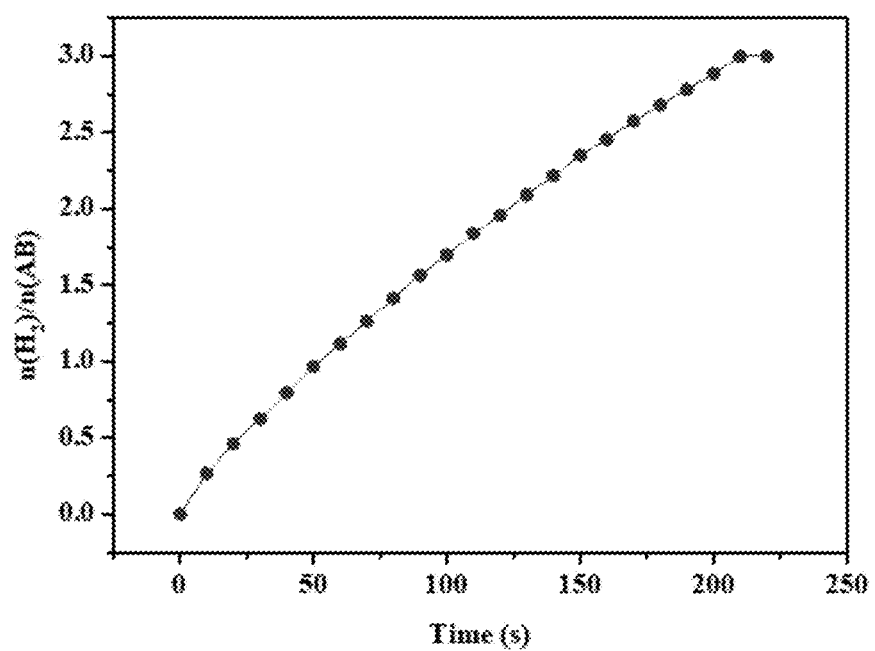
FIG. 7 is a test curve showing catalytic hydrogen generation of the yolk/shell-type $Co_xCu_{1-x}Co_2O_4@Co_yCu_{1-y}Co_2O_4$ catalyst in embodiment 1.

The catalytic hydrogen generation performances of the yolk/shell-type Co$_x$Cu$_{1-x}$Co$_2$O$_4$@Co$_y$Cu$_{1-y}$Co$_2$O$_4$ catalysts prepared in embodiments 1-8 are subjected to test analysis, wherein the dosage of NH$_3$BH$_3$ is 3 mmol, the dosage of NaOH is 20 mmol, and the dosage of the yolk/shell-type Co$_x$Cu$_{1-x}$Co$_2$O$_4$@Co$_y$Cu$_{1-y}$Co$_2$O$_4$ catalyst is 10 mg. It is tested that by using Co$_x$Cu$_{1-x}$Co$_2$O$_4$@Co$_y$Cu$_{1-y}$Co$_2$O$_4$ as a catalyst, 60-80 mL of hydrogen is generated every minute at 25° C., as shown in FIG. 7 which is a test curve showing catalytic hydrogen generation of the yolk/shell-type Co$_x$Cu$_{1-x}$Co$_2$O$_4$@Co$_y$Cu$_{1-y}$Co$_2$O$_4$ catalyst in embodiment 1. It can be known from FIG. 7 that by using the yolk/shell-type Co$_x$Cu$_{1-x}$Co$_2$O$_4$@Co$_y$Cu$_{1-y}$Co$_2$O$_4$ catalyst in embodiment 1, about 75 mL of hydrogen is generated every minute.

All technical features of all of the above-mentioned embodiments can be combined arbitrarily. In order to make the descriptions concise, not all possible combinations of all the technical features in the above-mentioned embodiments are described. However, the combinations of these technical features should be regarded as the scope recorded by the description as long as they do not conflict.

The above-mentioned embodiments only express several implementation modes of the present invention and are described relatively specifically in detail, but cannot be hence understood as limitations on the patent scope of the present invention. It should be noted that several variations and improvements can also be made by the those of ordinary skill in the art without departing from the concept of the present invention, these variations and improvements fall within the protective scope of the present invention, and therefore, the patent protective scope of the present invention shall be subject to the appended claims.

The invention claimed is:

1. A preparation method of a yolk/shell-type Co$_x$Cu$_{1-x}$Co$_2$O$_4$@Co$_y$Cu$_{1-y}$Co$_2$O$_4$ catalyst with 0<x<1 and 0<y<1, characterized by comprising the following steps:

step S1, dissolving 3-4.5 mmol of Co(NO$_3$)$_2$·6H$_2$O, 1.5-2.25 mmol of C$_6$H$_{12}$N$_4$ and 1-1.5 mmol of Na$_3$C$_6$H$_5$O$_7$·2H$_2$O into 30-50 mL of water, and performing continuous stirring until dissolution to obtain a mixed solution;

step S2, transferring the mixed solution to a 100 mL reactor and reacting the mixed solution at 80-160° C. for 8-24 h, and the mixed solution is cooled to room temperature after the reaction is ended;

step S3, performing suction filtration and water washing for the mixed solution to obtain a [Co(C$_6$H$_{12}$N$_4$)$_2$](NO$_3$)$_2$ precipitate serving as an intermediate, and drying the precipitate at 40-60° C. in a vacuum oven to yield a first obtained sample;

step S4, heating the first obtained sample from room temperature to 200° C. at a heating rate of 10° C./min in a muffle furnace and continuously calcining the obtained sample at 200-400° C. for 1-4 h to obtain yolk/shell-type Co$_3$O$_4$, and the yolk/shell-type Co$_3$O$_4$ is cooled to room temperature;

step S5, dissolving 0.05-0.1 g of Co$_3$O$_4$, 0.375-1.5 mmol of copper salt and 0.1875-0.75 mmol of C$_7$H$_5$NaO$_3$ into deionized water, and performing continuous stirring until dissolution to yield a solution;

step S6, transferring the solution obtained in the step S5 to a 100 mL single-neck flask, and putting the flask containing the solution into an oil bath pan; performing reflux condensation on the solution obtained in the step S5, at 80-120° C. for 6-12 h, collecting a precipitate, and washing the precipitate for 1-5 times, and then, and drying the precipitate at 40-60° C. in a vacuum oven to obtain a second obtained sample; and step S7, heating the second obtained sample from room temperature to 300-500° C. at a heating rate of 1-3° C./min in the muffle furnace and continuously calcining the sample at 300-500° C. for 2-5 h to obtain the yolk/shell-type $Co_xCu_{1-x}Co_2O_4@Co_yCu_{1-y}Co_2O_4$;

wherein the step S4 comprises: heating the obtained sample from room temperature to 200-400° C. at a heating rate of 2-10° C./min, and continuously calcining the sample for 1-4 h to obtain the yolk/shell-type $Co_3O_4$ catalyst, and in the step S5, the copper salt is $CuCl_2$.

2. A preparation method of a yolk/shell-type $Co_xCu_{1-x}Co_2O_4@Co_yCu_{1-y}Co_2O_4$ catalyst with $0<x<1$ and $0<y<1$, characterized by comprising the following steps:

step S1, dissolving 4.5 mmol of $Co(NO_3)_2 \cdot 6H_2O$, 2.25 mmol of $C_6H_{12}N_4$ and 1-1.5 mmol of $Na_3C_6H_5O_7 \cdot 2H_2O$ into 35 mL of water, and performing continuous stirring until dissolution to obtain a mixed solution;

step S2, transferring the mixed solution to a 100 mL reactor and reacting the mixed solution at 100° C. for 8-24 h, and the mixed solution is cooled to room temperature after the reaction is ended;

step S3, performing suction filtration and water washing for the mixed solution to obtain a $[Co(C_6H_{12}N_4)_2](NO_3)_2$ precipitate serving as an intermediate, and drying the precipitate at 40° C. in a vacuum oven to yield a first obtained sample;

step S4, heating the first obtained sample from room temperature to 200° C. at a heating rate of 10° C./min in a muffle furnace and continuously calcining the obtained sample at 200-400° C. for 1-4 h to obtain yolk/shell-type $Co_3O_4$, and the yolk/shell-type $Co_3O_4$ is cooled to room temperature;

step S5, dissolving 0.1 g of $Co_3O_4$, 1.5 mmol of copper salt and 0.75 mmol of $C_7H_5NaO_3$ into 20 mL deionized water, and performing continuous stirring until dissolution to yield a solution;

step S6, transferring the solution obtained in the step S5 to a 100 mL single-neck flask, and putting the flask containing the solution into an oil bath pan; performing reflux condensation on the solution obtained in the step S5, at 90° C. for 12 h, collecting a precipitate, and washing the precipitate for 1-5 times, and then, and drying the precipitate at 40-60° C. in a vacuum oven to obtain a second obtained sample; and step S7, heating the second obtained sample from room temperature to 400° C. at a heating rate of 2° C./min in the muffle furnace and continuously calcining the sample at 300-500° C. for 3 h to obtain the yolk/shell-type $Co_xCu_{1-x}Co_2O_4@Co_yCu_{1-y}Co_2O_4$;

wherein the step S4 comprises: heating the obtained sample from room temperature to 200° C. at a heating rate of 10° C./min, and continuously calcining the sample for 3 h to obtain the yolk/shell-type $Co_3O_4$ catalyst, and in the step S5, the copper salt is $CuCl_2$.

3. A preparation method of a yolk/shell-type $Co_xCu_{1-x}Co_2O_4@Co_yCu_{1-y}Co_2O_4$ catalyst with $0<x<1$ and $0<y<1$, characterized by comprising the following steps:

step S1, dissolving 3 mmol of $Co(NO_3)_2 \cdot 6H_2O$, 1.5 mmol of $C_6H_{12}N_4$ and 1 mmol of $Na_3C_6H_5O_7 \cdot 2H_2O$ into 30 mL of water, and performing continuous stirring until dissolution to obtain a mixed solution;

step S2, transferring the mixed solution to a 100 mL reactor and reacting the mixed solution at 100° C. for 24 h, and the mixed solution is cooled to room temperature after the reaction is ended;

step S3, performing suction filtration and water washing for the mixed solution to obtain a $[Co(C_6H_{12}N_4)_2](NO_3)_2$ precipitate serving as an intermediate, and drying the precipitate at 40° C. in a vacuum oven to yield a first obtained sample;

step S4, heating the first obtained sample from room temperature to 200° C. at a heating rate of 10° C./min in a muffle furnace and continuously calcining the obtained sample at 200-400° C. for 3 h to obtain yolk/shell-type $Co_3O_4$, and the yolk/shell-type $Co_3O_4$ is cooled to room temperature;

step S5, dissolving 0.1 g of $Co_3O_4$, 1.5 mmol of copper salt and 0.75 mmol of $C_7H_5NaO_3$ into 20 mL deionized water, and performing continuous stirring until dissolution to yield a solution;

step S6, transferring the solution obtained in the step S5 to a 100 mL single-neck flask, and putting the flask containing the solution into an oil bath pan; performing reflux condensation on the solution obtained in the step S5, at 90° C. for 12 h, collecting a precipitate, and washing the precipitate for 3 times, and then, and drying the precipitate at 40° C. in a vacuum oven to obtain a second obtained sample; and step S7, heating the second obtained sample from room temperature to 400° C. at a heating rate of 2° C./min in the muffle furnace and continuously calcining the sample at 300-500° C. for 3 h to obtain the yolk/shell-type $Co_xCu_{1-x}Co_2O_4@Co_yCu_{1-y}Co_2O_4$;

wherein the step S4 comprises: heating the obtained sample from room temperature to 200° C. at a heating rate of 10° C./min, and continuously calcining the sample for 3 h to obtain the yolk/shell-type $Co_3O_4$ catalyst; and in the step S5, the copper salt is $CuCl_2$.

* * * * *